United States Patent
Song et al.

(10) Patent No.: US 9,171,080 B2
(45) Date of Patent: Oct. 27, 2015

(54) DOMAIN CONSTRAINT PATH BASED DATA RECORD EXTRACTION

(75) Inventors: Xinying Song, Harbin (CN); Zhiyuan Chen, Fuzhou (CN); Yunbo Cao, Beijing (CN); Chin-Yew Lin, Beijing (CN)

(73) Assignee: Microsoft Technology Licensing LLC, Redmond, WA (US)

(*) Notice: Subject to any disclaimer, the term of this patent is extended or adjusted under 35 U.S.C. 154(b) by 595 days.

(21) Appl. No.: 13/356,241

(22) Filed: Jan. 23, 2012

(65) Prior Publication Data

US 2012/0124086 A1 May 17, 2012

Related U.S. Application Data

(63) Continuation-in-part of application No. 12/945,517, filed on Nov. 12, 2010, now Pat. No. 8,983,980.

(51) Int. Cl.
*G06F 17/30* (2006.01)
*G06F 17/22* (2006.01)

(52) U.S. Cl.
CPC ........ *G06F 17/30864* (2013.01); *G06F 17/227* (2013.01); *G06F 17/30867* (2013.01)

(58) Field of Classification Search
CPC ............... G06F 17/30896; G06F 17/30864; G06F 17/30914; G06F 17/30867; G06F 17/227
USPC .................... 707/769, 812; 715/205
See application file for complete search history.

(56) References Cited

U.S. PATENT DOCUMENTS

| | | |
|---|---|---|
| 7,512,610 B1 | 3/2009 | Barabas et al. |
| 8,589,366 B1 | 11/2013 | Younes et al. |
| 2003/0229850 A1 | 12/2003 | Lue |
| 2006/0026496 A1 | 2/2006 | Joshi et al. |
| 2008/0071819 A1 | 3/2008 | Monsarrat |
| 2009/0265363 A1 | 10/2009 | Lai et al. |
| 2010/0083095 A1 | 4/2010 | Nikovski et al. |
| 2010/0115436 A1 | 5/2010 | Embley et al. |
| 2010/0185684 A1 | 7/2010 | Madaan et al. |
| 2010/0185689 A1 | 7/2010 | Hu et al. |
| 2010/0211533 A1 | 8/2010 | Yang et al. |
| 2010/0241639 A1 | 9/2010 | Kifer et al. |
| 2011/0066957 A1 | 3/2011 | Prats et al. |
| 2011/0161409 A1 | 6/2011 | Nair et al. |
| 2011/0246261 A1 | 10/2011 | Kassaei et al. |

(Continued)

OTHER PUBLICATIONS

Office action for U.S. Appl. No. 12/945,517, mailed on Apr. 19, 2013, Song et al., "Domain Constraint Based Data Record Extraction", 29 pages.

(Continued)

*Primary Examiner* — Shahid Alam
(74) *Attorney, Agent, or Firm* — Dan Choi; Judy Yee; Micky Minhas (57) ABSTRACT

Described herein are techniques for extracting data records containing user-generated content from documents. The documents may be processed into document trees in which sub-trees represent the data records of the document. Domain constraints may be used to locate structured portions of the document tree. For example, anchor trees may be located as being sets of sibling sub-trees with similar tag paths that contain the domain constraints. The anchor trees may then be used to determine a record boundary (e.g., the start offset and length) of the data records. Finally, the data records may be extracted based on the anchor trees and the record boundaries.

20 Claims, 8 Drawing Sheets

(56) References Cited

U.S. PATENT DOCUMENTS

2011/0252073 A1* 10/2011 Pauly .................... 707/812
2012/0005686 A1   1/2012 Rajan et al.

OTHER PUBLICATIONS

Office action for U.S. Appl. No. 12/945,517, mailed on Oct. 11, 2012, Song et al., "Domain Constraint Based Data Record Extraction," 21 pages.
Arasu et al, "Extracting Structured Data from Web Pages", In SIGMOD 2003: Proceedings of the 2003 ACM SIGMOD international conference on Management of data, Jun. 2003, pp. 337-348.
Buttler et al, "A Fully Automated Object Extraction System for the World Wide Web", In ICDCS 2001: Proceedings of the the 21st International Conference on Distributed Computing Systems, Apr. 2001, 10 pgs.
Buttler, "A Short Survey of Document Structure Similarity Algorithms", In International Conference on Internet Computing, Jun. 2004, 9 pgs.
Chakrabarti et al, "The Paths More Taken: Matching DOM Trees to Search Logs for Accurate Webpage Clustering", In WWW, Apr. 2010, 10 pgs.
Chang et al, "A Survey of Web Information Extraction Systems", IEEE Trans. on Knowl. and Data Engineering, vol. 18, No. 10, Oct. 2006, pp. 1411-1428.
Chang et al, "IEPAD: Information Extraction based on Pattern Discovery", In WWW 2001: Proceedings of the 10th international conference on World Wide Web, May 2001, pp. 681-688.
Chuang et al, "Tree-structured Template Generation for Web Pages", In WI 2004: Proceedings of the 2004 IEEE WIC and ACM International Conference on Web Intelligence, Sep. 2004, pp. 327-333.
Cormen et al, "Introduction to Algorithms, Second Edition", The MIT Press and McGraw-Hill Book Company, 2001. Chapt 11, Hash Tables, 37 pgs.
Crescenzi et al, "Roadrunner: Towards Automatic Data Extraction from Large Web Sites", In VLDB,Sep. 2001, pp. 109-118.
Embley et al, "Record-boundary Discovery in Web Documents", SIGMOD, Jun. 1999, pp. 467-478.
Hlaing, et al., "An Approach for Extraction Data Record from Web Page based on Visual Features", In Proceedings of the International Journal of Advances in Management Science, vol. 1-1, Aug. 2011, 7 pages.
Hogue, et al., "Thresher: Automating the Unwrapping of Semantic Content from the World Wide Web", In Proceedings of the 14th International Conference on World Wide Web, May 10-14, 2005, pp. 86-95.
Hu et al, "Mining and Summarizing Customer Reviews", In SIGKDD, Aug. 2004, 10 pgs.
Labsky, et al., "The Ex Project:Web Information Extraction using Extraction Ontologies", Proceedings of ECML/PKDD Workshop on Prior Conceptual Knowledge in Machine Learning and Knowledge Discovery (PriCKL), Oct. 2007, 12 pgs.
Laender et al, "A Brief Survey of Web Data Extraction Tools", SIGMOD, Jun. 2002, vol. 31, pp. 84-93.
Liu et al, "Mining Data Records in Web Pages", In Proceedings of the ACM SIGKDD International Conference on Knowledge Discovery & Data Mining (KDD2003), Aug. 2003, 6 pgs.
Liu et al, "NET—a System for Extracting Web Data from Flat and Nested Data Records ", In Proceedings of 6th International Conference on Web Information Systems Engineering (WISE05), Nov. 2005, 8 pgs.
Liu, "Web Content Mining", retrieved on Aug. 25, 2010 at <<http://www.cs.uic.edu/~liub/Web-Content-Mining-2.pdf>>, Proceedings of International World Wide Web Conference—Tutorial (WWW), Chiba, Japan, May 2005, 83 pgs.
Liu, "Web Data Mining: Exploring Hyperlinks, Contents, and Usage Data", from Data-Centric Systems and Applications, Springer Series on Data-Centric Systems and Applications, 2007, 543 pgs.
Liu, "Web Data Mining: Exploring Hyperlinks, Contents and Usage Data", Data-Centric Systems and Applications (Book), Chap 9.5.2 through Chap 9.9, Springer-Verlag Berlin Heidelberg 2007, pp. 346 to 367.
Miao et al, "Extracting Data Records from the Web using Tag Path Clustering", In WWW 2009: Proceedings of the 18th international conference on World wide web, Apr. 2009, pp. 981-990.
Myllymaki, Jussi, "Effective Web Data Extraction with Standard XML Technologies", In Proceedings of the 10th International Conference on World Wide Web, May 1-5, 2001, pp. 689-696.
Reis et al, "Automatic Web News Extraction using Tree Edit Distance", In WWW, May 2004, pp. 502-511.
Selkow, "The Tree-to-Tree Editing Problem", Information Processing Letters, vol. 6, No. 6, Dec. 1977, pp. 184-186.
Simon et al, "VIPER: Augmenting Automatic Information Extraction with Visual Perceptions", In CIKM 2005: Proceedings of the 14th ACM international conference on Information and knowledge management, Oct. and Nov. 2005, pp. 381-388.
Song et al, "Automatic Extraction of Web Data Records Containing User-Generated Content", In CIKM 2010: Proceeding of the 19th ACM conference on Information and knowledge management, Oct. 2010, pp. 39-48.
Tai, "The Tree-to-tree Correction Problem", Journal of Association for Computer Machinery, vol. 26, No. 3, Jul. 1979, pp. 422-433.
Wang et al, "Data Extraction and Label Assignment for Web Databases", In WWW 2003: Proceedings of the 12th international conference on World Wide Web, May 2003, pp. 187-196.
Yang et al, "A Structural Support Vector Method for Extracting Contexts and Answers of Questions from Online Forums", In EMNLP, 2009 Conf on Empirical Methods in Natural Language Processing, Aug. 2009, pp. 514-523.
Yang, "Identifying Syntactic Differences between Two Programs", Software Practice and Experience, vol. 21(7), Jul. 1991, pp. 739-755.
Yang et al, "Incorporating Site-level Knowledge to Extract Structured Data from Web Forums", In WWW 2009, Apr. 2009, 10 pgs.
Yin, et al., "Automatic Extraction of Clickable Structured Web Contents for Name Entity Queries", In Proceedings of the 19th International Conference on World Wide Web, Apr. 26-30, 2010, pp. 991-1000.
Zhai et al, "Web Data Extraction based on Partial Tree Alignment", In WWW, May 2005, 10 pgs.
Zhao et al, "Fully Automatic Wrapper Generation for Search Engines", WWW, May 2005, pp. 66-75.
Zheng et al, "Efficient Record-level Wrapper Induction", In CIKM, Nov. 2009, 9 pgs.
Zheng et al, "Joint Optimization of Wrapper Generation and Template Detection ", In KDD 2007: Proceedings of the 13th ACM SIGKDD international conference on Knowledge discovery and data mining, Aug. 2007, pp. 894-902.
Zhu, et al., "Dynamic Hierarchical Markov Random Fields and their Application to Web Data Extraction", ACM, Proceedings of International Conference on Machine Learning (ICML), vol. 227, Jun. 2007, 8 pgs.
Zhu et al, "Simultaneous Record Detection and Attribute Labeling in Web Data Extraction", In KDD 2006: Proceedings of the 12th ACM SIGKDD international conference on Knowledge discovery and datamining, Aug. 2006, pp. 494-503.
Office action for U.S. Appl. No. 12/945,517, mailed on May 8, 2014, Song et al., "Domain Constraint Based Data Record Extraction", 29 pages.

\* cited by examiner

DOMAIN CONSTRAINT PATH BASED DATA RECORD EXTRACTION

RELATED APPLICATION

This application is a continuation-in-part of U.S. patent application Ser. No. 12/945,517 entitled "Domain Constraint Based Data Record Extraction," filed Nov. 12, 2010, which is incorporated herein by reference.

BACKGROUND

Data record extraction pertains to extracting data records containing user-generated content (UGC) from documents. Data record extraction may be useful in web mining applications such as question answering, blog or review mining, expert searching on web communities, etc. For example, a user who is interested in purchasing a new car may use data record extraction techniques to mine customer reviews pertaining to a new car of interest so that the user can make an informed decision on whether to purchase the new car.

In prior implementations, data record extraction techniques generally assume that the data records contain a limited amount of UGC and thus have similar structures. However, due to the free-format nature of UGC, data records containing UGC are generally of unstructured formats.

SUMMARY

This disclosure describes techniques and systems for extracting data records containing user-generated content (UGC) from documents. Unlike previous methods which assume that data records containing UGC have similar structures, the data record extraction techniques described herein adopt a domain constraint approach referred to as Mining Data Records based on Anchor Trees (MiBAT). In general, MiBAT distinguishes a structured portion of the data records (e.g., author, publication date, etc.) from the free-formatted unstructured UGC part. The MiBAT process then uses the structured portion of the data records to locate and extract the data records.

To distinguish the structured part of a document from the unstructured UCG part, the MiBAT process represents the document as a tree and locates anchor trees within the representative tree based on a domain constraint. After locating the anchor trees, the MiBAT process determines record boundaries (e.g., start offset and length) of the data records. Finally, the data records are extracted based on the record boundaries. The data records may then be stored or may be outputted. Other embodiments will become more apparent from the following detailed description when taken in conjunction with the accompanying drawings.

This Summary is provided to introduce a selection of concepts in a simplified form. This Summary is not intended to identify key features or essential features of the claimed subject matter, nor is it intended to be used to limit the scope of the claimed subject matter.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This disclosure describes techniques of Mining Data Records based on Anchor Trees (MiBAT). Various embodiments utilize domain constraints to extract data records containing User-generated Content (UGC). The MiBAT process may distinguish a structured portion of the data records which is structurally similar across data records (e.g., author, publication date, etc.) from the free-formatted unstructured UGC part (which may be structurally diverse across records) rather than assuming that data records containing UGC have similar structures overall. Accordingly, based on the detection of the repetition of similar structures of the structured portion, the MiBAT process may automatically extract consecutive or non-consecutive data records containing UGC from documents, for example web documents, even though the UGC is unstructured.

For example, in order to analyze the parts of a document that are represented as a document tree in which nodes of the document tree include the UGC, a document tree may be a Document Object Model (DOM) tree. Each data record of a data record list may be deemed as comprising the same number of sibling sub-trees on the document tree of the document, where each of the sibling sub-trees may be deemed the component sub tree of the record. The nodes of the document tree may then be analyzed based on a domain constraint. Domain constraints may be any object type that may be used as a basis for expression matching such as dates, times, numerical strings, etc. The nodes of the document tree which contain domain constraints are deemed the pivots.

By focusing on the repetitive similar structures of the data records, the MiBAT process may be able to automatically extract data records without too much prior knowledge or assumptions on the overall structure of the data records on the documents. As a result, the MiBAT process may pertain to extracting data records from a single document that contains at least two or more data records. The MiBAT process may not be designed to extract data records from a document that contains only one single data record.

For example, in some instances, the post publication date (e.g., post-date) may be selected as the domain constraint since post-dates are commonly found in the structured part of a data record. The nodes of the document tree which are identified as containing text having a format of the domain constraint may be deemed the candidate pivots of the document tree. However, not all of the nodes containing text having a format of the domain constraint are necessarily real pivots (e.g., in forum posts, UGC may also contain strings in date format). Accordingly, similarity measures may be applied to determine the anchor trees as being the component sub-trees of data records which contain the real pivot nodes. After locating the anchor trees, the MiBAT process may determine record boundaries (e.g., start offset and length) of the data records. Finally, the data records may be extracted based on the record boundaries. The data records may then be stored or may be outputted.

The techniques and systems described herein may be implemented in a number of ways. Example implementations are provided below with reference to the following figures.

Illustrative Environment

Figure 1:
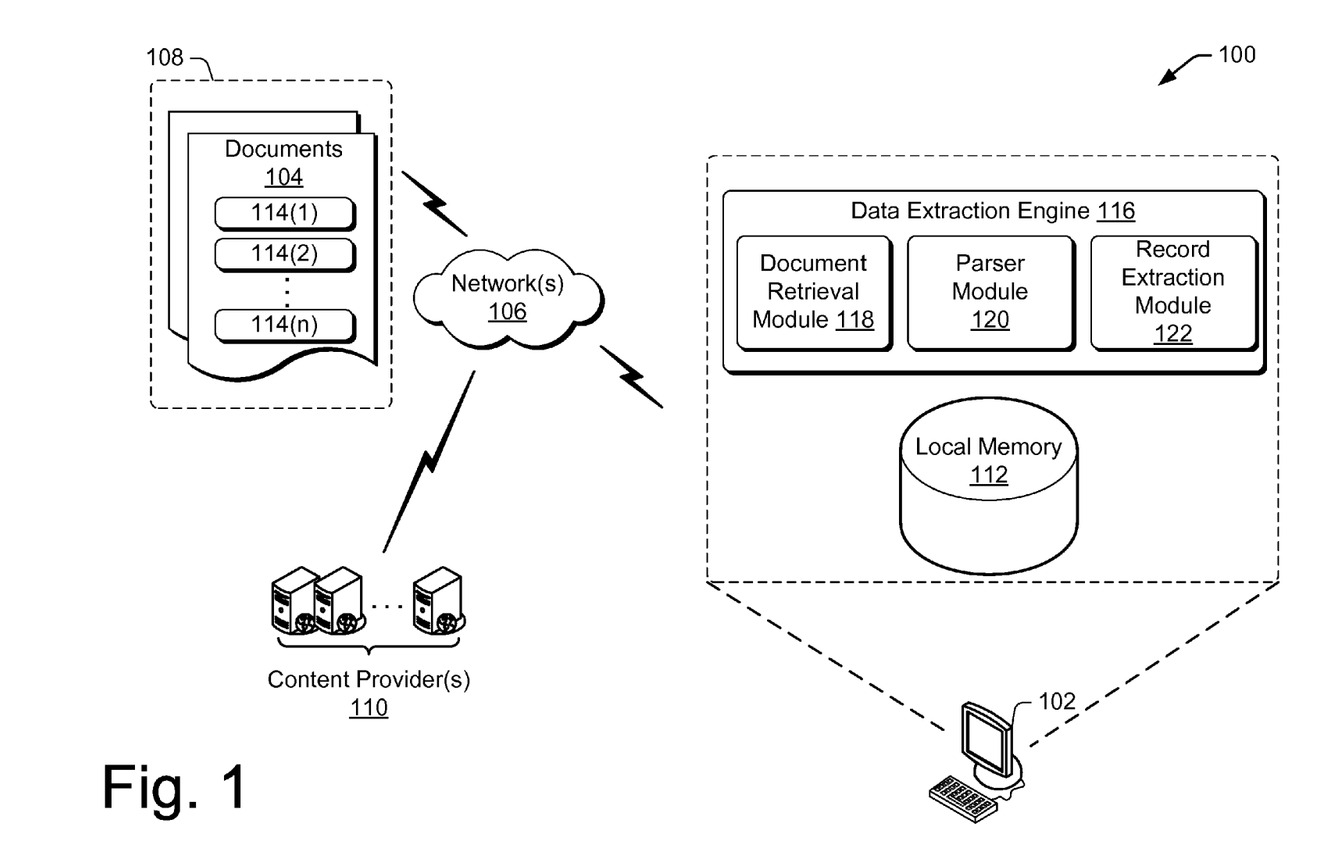
FIG. 1 shows a block diagram that illustrates a computing environment for extracting data records containing user-generated content from documents, in accordance with various embodiments.

FIG. 1 shows an illustrative computing environment 100 for extracting data records, in accordance with various embodiments. The computing environment 100 may include a computing device 102 to extract the data records. The computing devices 102 may include any sort of such as personal computers, laptop computers, mobile phones, set-top boxes, game consoles, personal digital assistants (PDAs), portable media players (PMPs) (e.g., portable video players (PVPs) and digital audio players (DAPs)), and other types of computing devices.

The computing device 102 may access one or more documents 104 via one or more networks 106. The one or more networks 106 may include at least one of wide-area networks (WANs), local area networks (LANs), and/or other network architectures. The documents 104 may be located at one or more locations such as a World Wide Web 108 (hereinafter "web"), one or more content provider(s) 110 or servers, a local memory 112, or any combination thereof.

Each of the documents 104 may contain one or more data records 114(1)-(n). In some instances, one or more of the data records 114(1)-(n) may contain user-generated content (UGC). As used herein, UGC includes any media content which is produced by end-users and is available to a plurality of users (e.g., publically available, available on a local intranet, etc.). For instance, UGC may include forum posts, reviews, blogs, comments, or any other end-user produced content that is publically available.

The computing device 102 may include a data extraction engine 116 to extract the data records 114(1)-(n) containing the UGC from the documents 104. For example, a user who is interested in purchasing a new car may use the data extraction engine 116 to mine all customer reviews pertaining to a new car of interest so that the user can make an informed decision on whether to purchase the new car. In other examples, the data extraction engine 116 may be used for question answering, blog or review mining, expert searching on web communities, etc.

In some instances, the techniques of the data extraction engine 116 may be implemented for visualizing, reorganizing, or reformatting the information or the layout of the documents 104 and thus providing a better browsing experience for users. For example, data extraction engine techniques may be used to highlight, selectively display or reformat, certain important blocks (or areas) of the documents 104 as users browse documents in web browsers or mobile devices with limited size of screens. In some instances, this kind of use may be achieved by implementing the techniques of the data extraction engine 116 on the client side such as add-ons of web browsers or applications on mobile devices. In some instances, this kind of use may also be achieved by incorporating the techniques of the data extraction engine 116 into remote intermediate web services between the original documents 104 and the local browsing devices such as web browsers or mobile devices, which perform the visualizing, reorganizing or reformatting of the documents 104 and return the processed documents to the local devices; such web services may be located at one or more locations such as a World Wide Web 108, one or more content provider(s) 110 or servers, or any combination thereof.

In other instances, the techniques of the data extraction engine 116 may be used to reduce a size of an index of a search engine, or to improve the relevance of an index of a search engine. For example, for forum pages, if the data records 114 recognized by the data extraction engine 116 are assumed to be the most important parts of the documents 104, then a search engine may ignore other blocks of the documents and only index the blocks identified by the data extraction engine 116. By this means the relevance of the index is also improved because other irrelevant and noisy blocks are not indexed.

The data extraction engine 116 may include one or more software components, such as a document retrieval module 118, a parser module 120, and a record extraction module 122, that are involved in data record extraction. In some instances, the various software components of the data extraction engine 116 may be implemented as a web browser, or any other application to perform the web data record extraction.

The document retrieval module 118 may retrieve the documents 104. The documents 104 may be retrieved from the web 108, the content providers 110, the local memory 112, or any combination thereof. For example, the document retrieval module 118 may retrieve the documents 104 from either the web 108 or the content providers 110 via a public or private wide area network (WAN) and/or public or private local area network (LAN), or other transmission and/or connectivity means. In another example, the document retrieval module 118 may retrieve the documents 104 from the local memory 112 via a local file I/O path such as a local bus.

After retrieving the documents 104, the parser module 120 may process the documents 104 into trees that are representative of the documents (referred to herein as "document trees") and that include UGC of the documents 104 in nodes of the trees. In some embodiments, the document trees may be Document Object Model (DOM) trees. The parser module 120 may be configured to parse various document formats including, but not limited to, markup or annotated languages including presentational, procedural, and/or descriptive markup languages, for example HyperText Markup Language (HTML), Extensible Mark-up Language (XML), Extensible HyperText Markup Language (XHTML), RUNOFF, and TeX.

The record extraction module 122 may use the DOM tree to extract the data records 114 including the UGC from the documents 104. Data record of a data record list may be deemed as comprising the same number of sibling sub-trees on the DOM tree of the document, where each of the sibling sub-trees may be deemed the component sub-tree of the record. In various embodiments, the record extraction module 122 utilizes a Mining Data Records Based on Anchor Trees (MiBAT) process to extract the data records 114 from the documents 104. The extracted data records 114 may be stored, such as to the web 108, content providers 110, and/or the local memory 112 or the extracted data records may be processed for output to the computing device 102.

Illustrative Document

Figure 2:
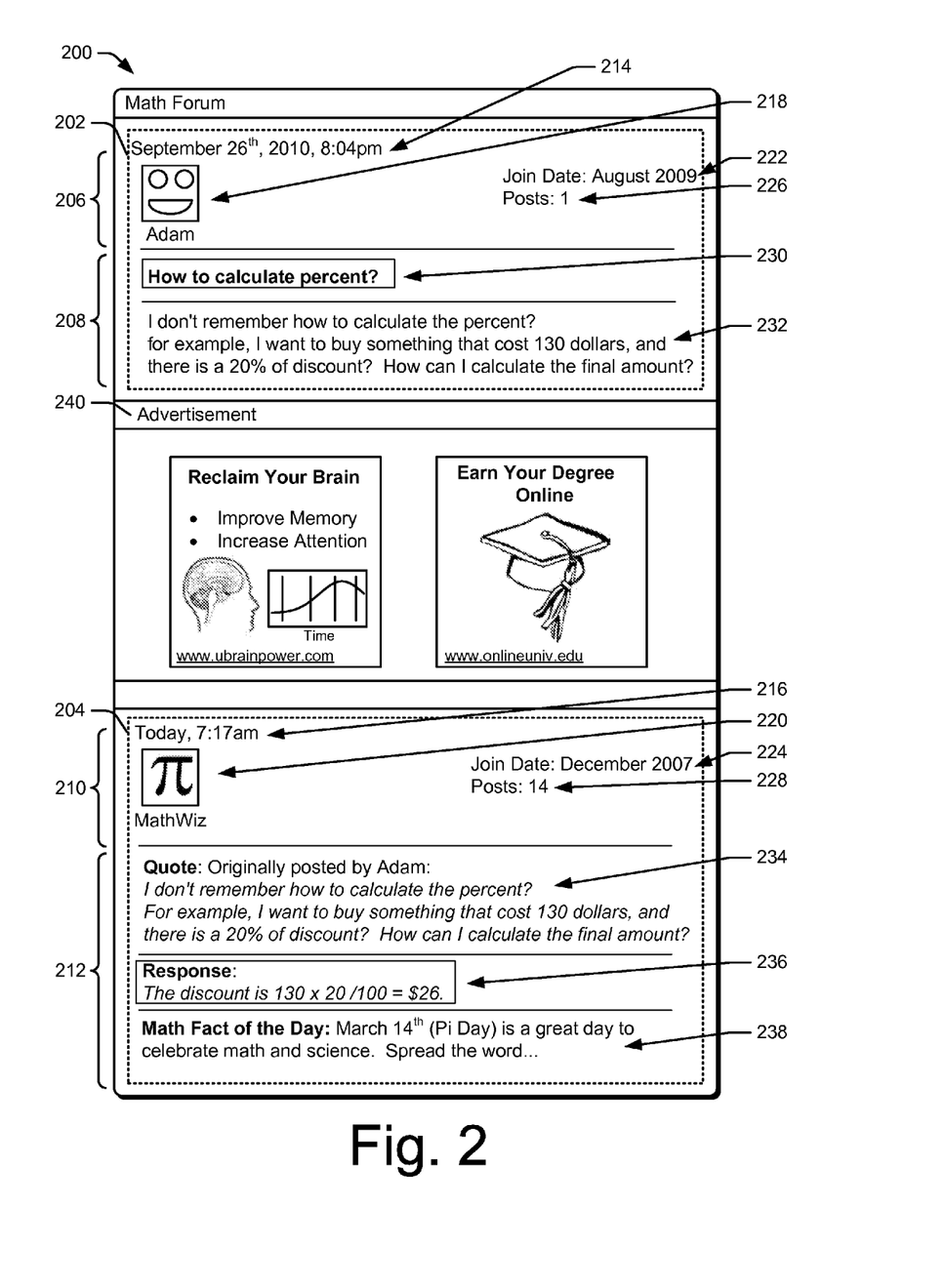
FIG. 2 shows an illustrative document that includes multiple data records.

FIG. 2 illustrates an example document 200. The example document 200 is depicted as a web forum and includes a first data record 202 and a second data record 204, both of which contain UGC. The first data record 202 is a question posted by an online user Adam regarding how to calculate percentages. The second data record 204 is a response to Adam's question posted by an online user MathWiz and includes an equation that can be used to calculate percentages. In general, data records containing UGC usually comprise two parts. First, the data records include a structured part such as author, publication date, etc. Second, the data records often include free-format UGC, referred to as the unstructured part. For example, the first data record 202 includes structured part 206 and unstructured part 208. Similarly, the second data record 204 includes structured part 210 and unstructured part 212.

Various embodiments discussed herein for extracting the data records 202, 204 from the example document 200 assume that the structured parts 206, 210 have a same structure. For instance, both structured parts 206, 210 include a publication date of the post 214, 216 (e.g., post-date), a username 218, 220 of the entity that made the post, a join date 222, 224 indicating a date the entity joined the forum, and a post number 226, 228 indicating the number of posts made under the username, etc. Due to the free-format nature of UGC, the unstructured part 208, 212 of the data records 202, 204 may not have a same structure. For instance, the unstructured part 208 of the first data record 202 includes two sections. It includes a post title 230 and post content 232 (e.g., original post). However, the unstructured part 212 of the second data record 204 includes three sections. It includes a quote 234 of the original post, a response 236 to the original post, and a quote of the day 238. In addition to the data records 202, 204, the example document 200 also includes an advertisement section 240 which includes two advertisements. As discussed further below, the data record extraction techniques discussed herein pertain to automatically extracting data records containing the UGC such as data records 202, 204 from such as the example document 200 even though the data records are not consecutive (e.g., there is an advertisement section between the first data record 202 and the second data record 204) and even though the unstructured parts 208, 212 of the data records vary from data record to data record within the document. Although the example document 200 is illustrated as having two data records, record extraction techniques discussed herein may pertain to documents having more than two data records.

The data record extraction techniques discussed herein are generally discussed in terms of extracting data records from web forums such as the example document 200. However, the data record extraction techniques may be applied to other types of applications such as blogs, web documents containing user comments (e.g., Twitter®, Flickr®, YouTube®, Digg®), web documents containing user reviews, etc. Accordingly, the data record extraction techniques are not restricted to web forums.

Illustrative Document Tree

Figure 3:
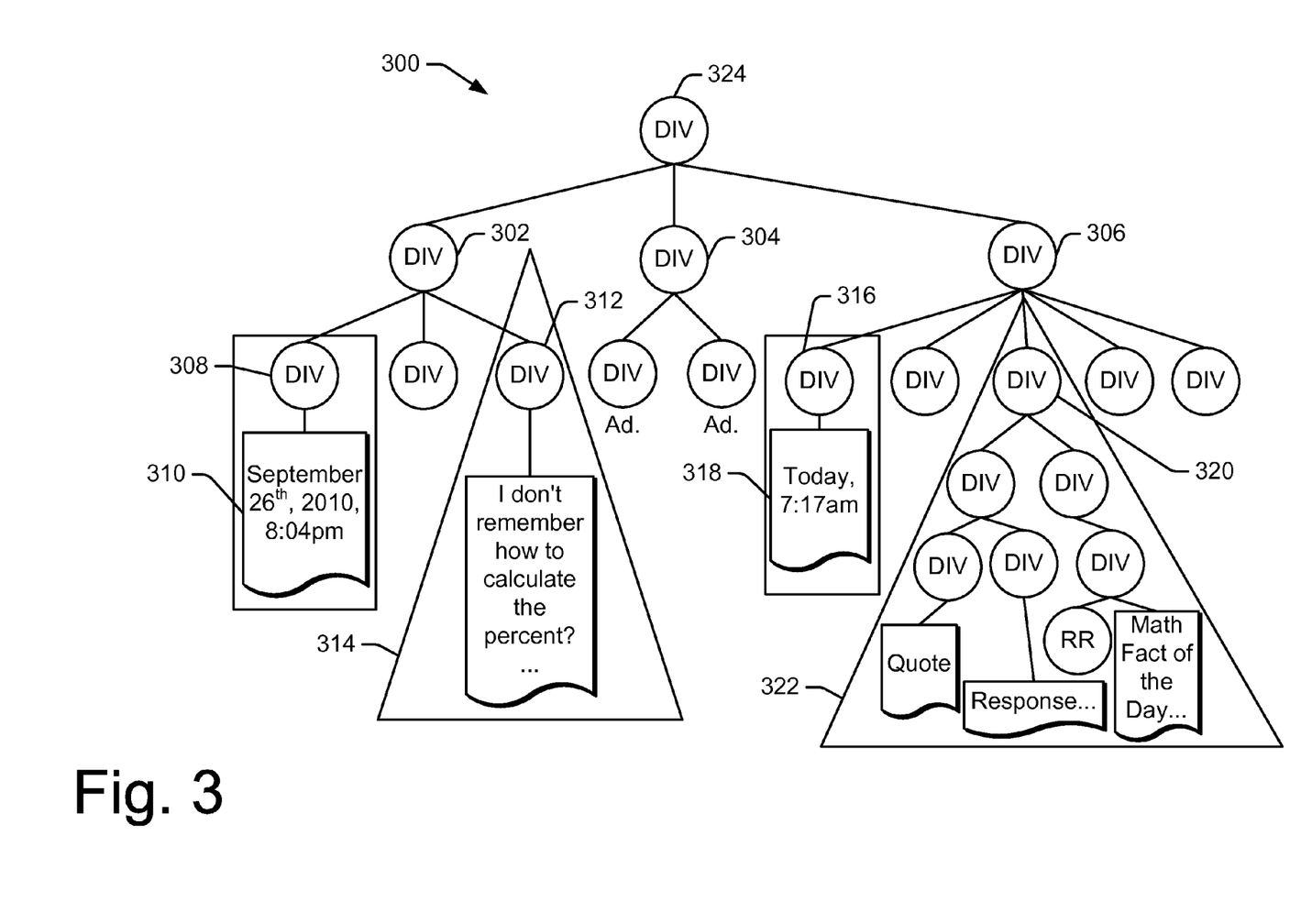
FIG. 3 shows a portion of an illustrative tree of the document in FIG. 2.

FIG. 3 shows a portion of an illustrative document tree of the example document of FIG. 2. The example document 200 may be represented by a document tree, for example, an example DOM tree 300. Namely, the example DOM tree 300 includes a question data record node 302 corresponding to the first data record 202, an advertisement section node 304 corresponding to the advertisement section 240, and a response data record node 306 corresponding to the second data record 204. Note that in the example DOM tree 300, each of the two data records comprise only one component sub-tree: at nodes 302 and 306, respectively.

The sub-tree at node 302 may include node 308 associated with post-date 310 corresponding to the publication date of the post 214. The sub-tree at node 302 may also include node 312 associated with UGC for the question data record at node 302. The sub-tree at node 302 may also include the collection of nodes represented by a first triangle 314 corresponding to the unstructured part 208.

The sub-tree at node 306 may include node 316 associated with post-date 318 corresponding to the publication date of the post 216. The sub-tree at node 306 may also include node 320 associated with UGC for the data record at node 306. The sub-tree at node 306 may also include the collection of nodes represented by a second triangle 322 corresponding to the unstructured part 212.

Illustrative Processes

For ease of understanding, the processes discussed in this disclosure are delineated as separate operations represented as independent blocks. However, these separately delineated operations should not be construed as necessarily order dependent in their performance. The order in which the processes are described is not intended to be construed as a limitation, and any number of the described process blocks may be combined in any order to implement the process, or an alternate process. Moreover, it is also possible that one or more of the provided operations may be modified or omitted.

The processes are illustrated as a collection of blocks in logical flowcharts, which represent a sequence of operations that can be implemented in hardware, software, or a combination of hardware and software. For discussion purposes, the processes are described with reference to the system shown in FIGS. 1-8. However, the processes may be performed using different architectures and devices.

Figure 4:
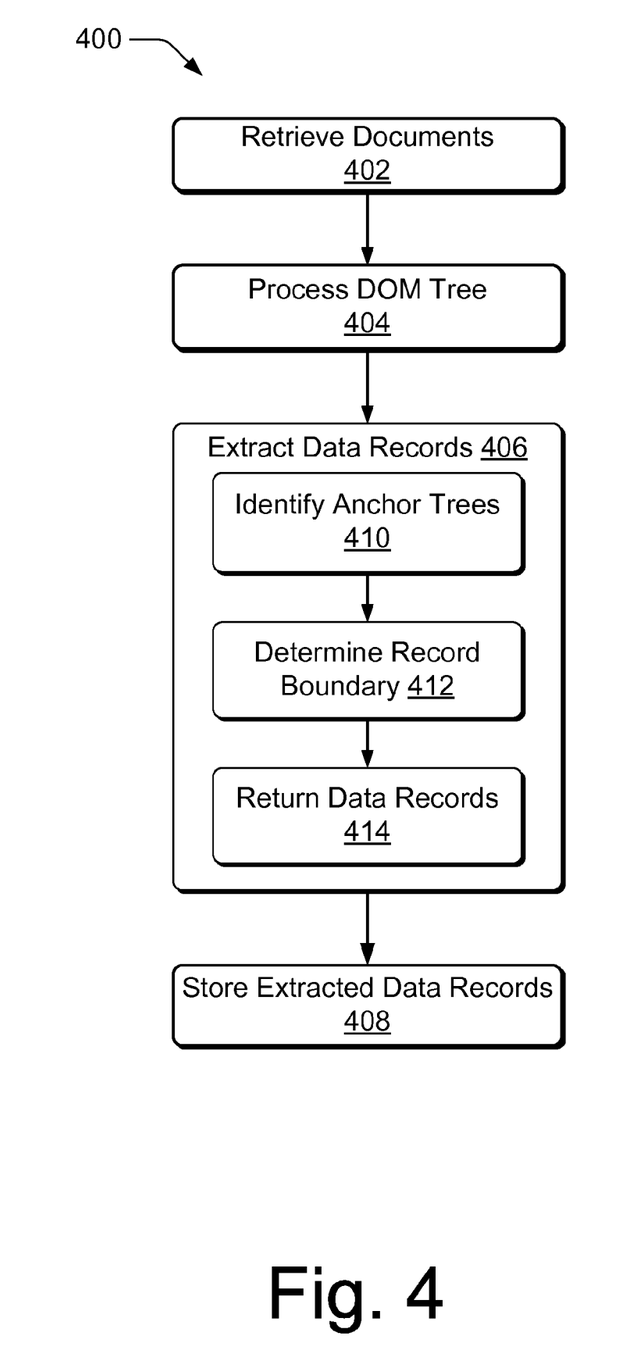
FIG. 4 is a flow diagram that shows an illustrative process to extract data records containing user-generated content in accordance with various embodiments including an illustrative Mining Data Records based on Anchor Trees (MiBAT) process.

FIG. 4 describes an illustrative process 400 to extract data records containing user-generated content (UGC) from documents in accordance with various embodiments. The process 400 may be implemented by the data extraction engine 116 of the computing device 102.

At 402, the document retrieval module 118 retrieves the one or more documents 104. The document retrieval module 118 may retrieve the documents 104 from the web 108, the content providers 110, the local memory 112, or any combination thereof.

At 404, the parser module 120 may process the documents 104 into a Document Object Model (DOM) tree. For example, an example DOM tree 300 illustrated in FIG. 3 corresponds to the example document 200 of FIG. 2.

At 406, the record extraction module 122 may use the DOM tree to extract the data records containing UGC from the document. In some instances, the record extraction module 122 utilizes a Mining Data Records Based on Anchor Trees (MiBAT) process to extract the data records from the documents 104. In general, an embodiment of the MiBAT process may be formulated as follows: (1) find anchor trees from the child sub-tree list of each parent node along a traversal on the DOM tree; for each anchor tree list, (2) determine the record boundary, (e.g., start offset and length), and (3) extract the data record around each anchor tree given the record boundary.

Anchor trees may be the component sub-trees of data records on the DOM tree that contain a domain constraint. Although any domain constraint may be used to locate the anchor trees, in some instances the domain constraint is part of the structured data which occurs in every data record once and exactly once and can be easily identified. The lowest nodes of the DOM tree containing the domain constraint may be deemed the pivots. For instance, the post-date (e.g., publication date of a data record) may be selected as the domain constraint since almost all data records containing UGC include a publication date and its format can be easily identified. Accordingly the lowest nodes containing the post-date may be the pivots. The record extraction module 122 may use the domain constraint to locate the anchor trees as being the component sub-trees of data records containing the domain constraint at 406. For instance, in the example DOM tree 300, the record extraction module 122 may locate pivot nodes at 310, 318 since they are the lowest nodes of the illustrative DOM tree that contain the publication date, and thus locate anchor trees at nodes 302 and 306, since they are sibling sub-trees that contain the domain constraints (e.g., the pivots), therefore being component sub-trees of the two data records corresponding to the data records 202 and 204, respectively, in FIG. 2. Note that the advertisement section node 304 does not contain a pivot and thus cannot be an anchor tree since the advertisement section 240 of the example document 200 does not contain any publication date data.

After locating the anchor trees at nodes 302, 306, the record extraction module 122 may determine the record boundary, (e.g., start offset and length) at 406. In general, the record boundary may be defined as a set of adjacent sibling component sub-trees around every anchor tree that comprises the data records including both the anchor trees as well as the UGC. For instance, in the example DOM tree 300, the UGC for the question data record node 302 is the collection of nodes represented by a first triangle 314 and the UGC for the response data record node 306 is the collection of nodes represented by a second triangle 322. The start offset of the record boundary may be deemed the offset of the left most component sub-tree relative to the anchor tree of each record, and the length is the number of component sub-trees of each record. For the example DOM tree 300, since both records comprise one component sub-tree (e.g., the anchor trees at nodes 302 and 306, respectively), the start offset of the record boundary is 0 and the length of the record boundary is 1. Note that this is a fairly easy case for record boundary determination, but there exist more complicated cases as will be discussed in later sections.

After locating the anchor trees at nodes 302, 306, and determining the record boundary, the record extraction module 122 may extract the data records containing the UGC from the document at 406. Unlike prior processes which assume that the data records containing the UGC have similar DOM tree structures, the MiBAT process of the data extraction engine 116 utilizes the domain constraint (e.g., post-date) as part of the MiBAT process to locate and extract the data records. Accordingly, the data extraction engine 116 is able to extract data records containing UGC even if the data records are non-consecutive (e.g., there are advertisements stuck between the data records) and even if a structure of the UGC varies from data record to data record within the document.

At 408, the data extraction engine 116 may store the extracted data records. For instance, the data extraction engine 116 may store the extracted data records to the web 108, content providers 110, and/or the local memory or the extracted data records may be processed for output to the computing device 102.

FIG. 4 also describes an illustrative process to extract data records containing UGC using the Mining Data Records Based on Anchor Trees (MiBAT) process. The illustrative process may further illustrate operations performed during the determining the extract data records block 406 of the illustrative process 400.

In general, the MiBAT process may use domain constraints to locate and extract data records that contain UGC. For reference, pseudo-code illustrating MiBAT process is provided below in Table 1.

TABLE 1

Pseudo-Code for Illustrative MiBAT Process

1:   procedure MIBAT(T)
2:       $\Omega \leftarrow \{\}$
3:       $\Delta \leftarrow$ FINDANCHORTREES(T)    ▷ find anchor tree list
4:       for $(p, a_1 \ldots a_m)$ in $\Delta$ do
5:           $R \leftarrow$ DETERMINEBOUNDARY $(p, a_1 \ldots a_m)$
6:           $\Omega \leftarrow \Omega \cup \{R\}$    ▷ a list of data records found
7:
8:       return $\Omega$    ▷ return record list At 410, the record extraction module 122 may identify an anchor tree list, $(a_1 \ldots a_m)$ as being a set of two or more sibling sub-trees which include the domain constraint (e.g., lines 3 and 4 of the pseudo-code of Table 1) of a parent tree node p. For example, with respect to the example DOM tree 300 of FIG. 3, under the parent node 324, the record extraction module 122 may identify the anchor tree represented by the tree at node 302 and the anchor tree represented by the tree at node 306 at 410. The process of identifying the anchor trees is discussed further below with respect to FIG. 5. At 412, the record extraction module 122 may determine the record boundary (e.g., line 5 of the pseudo-code of Table 1) which is discussed further below with respect to FIG. 6. At 414, the record extraction module 122 may return the data records (e.g., line 8 of the pseudo-code of Table 1).

Figure 5:
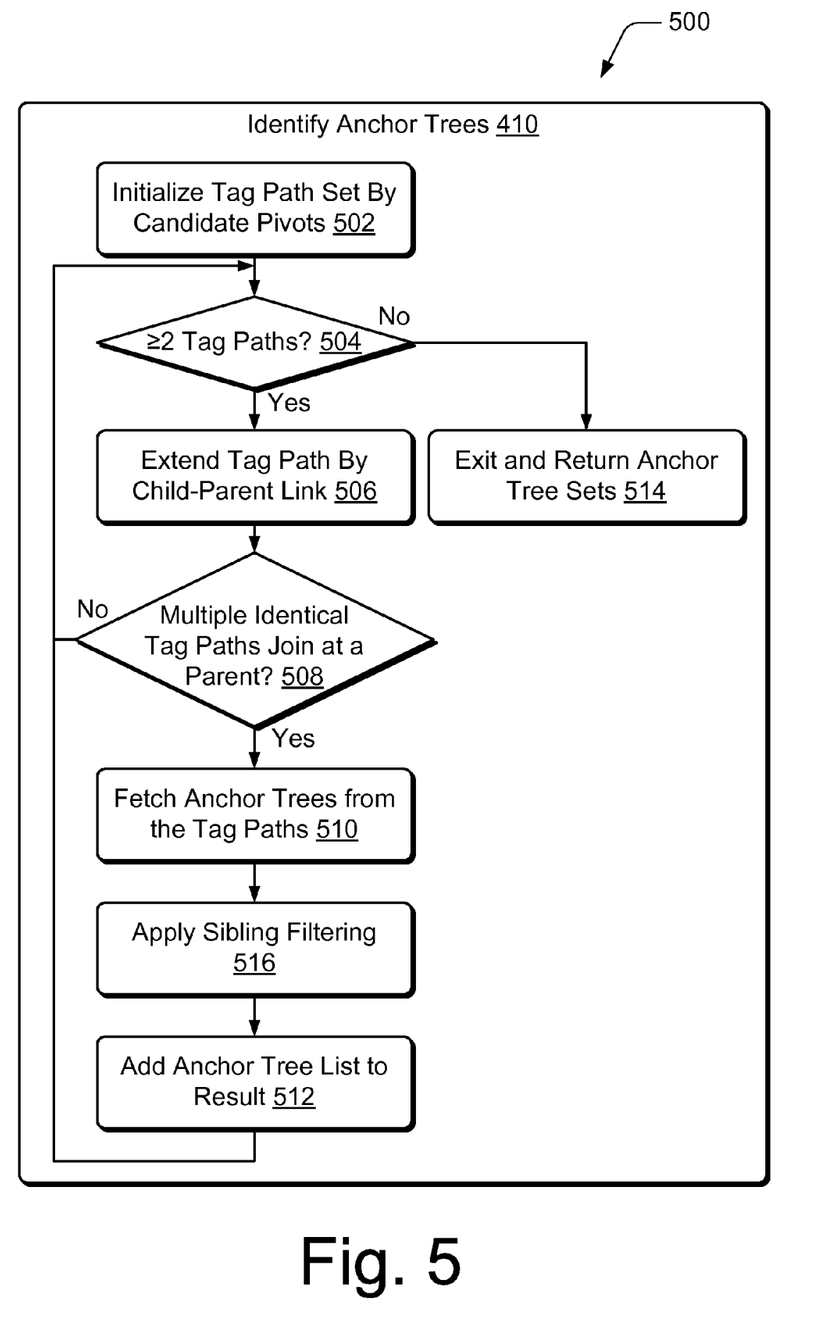
FIG. 5 is a flow diagram that shows an illustrative process of identifying anchor trees within a Document Object Model (DOM) tree in accordance with various embodiments.

FIG. 5 describes an illustrative process 500 to locate anchor trees. The illustrative process 500 may further illustrate operations performed during the identifying anchor trees block 410 of the illustrative process 400 (e.g., line 3 of the pseudo-code of Table 1).

In general, the record extraction module 122 may utilize domain constraint similarity measures to locate the anchor trees. For reference, pseudo-code illustrating the process 500 of identifying anchor trees is provided below in Table 2.

TABLE 2

Pseudo-Code for Illustrative Anchor Tree Identification

1:   procedure FINDANCHORTREES(T)
2:       $\Delta \leftarrow \{\}$    ▷ anchor tree lists to return
3:       $\Phi \leftarrow \{\}$    ▷ $\Phi$ may be a hash map set
4:       for candidate pivot v in T do
5:           $\Phi[(v, v.tag)] \leftarrow (\,)$    ▷ add v and its tag path
6:       while $|\Phi.keys| \geq 2$ do
7:           $\hat{\Phi} \leftarrow \{\}$
8:           for (v, path) in $\Phi.keys$ do
9:               $p \leftarrow v.parent$
10:              if $p \neq$ NULL then
11:                  $\hat{\Phi}[(p, p.tag+'/'+ path)].append(v.childIndex)$
12:          for (p, path) in $\Phi.keys$ do
13:              $a_1 \ldots a_m \leftarrow \hat{\Phi}[(p, path)]$
14:              if $m \geq 2$ then
15:                  $\Delta \leftarrow \Delta \cup \{(p, a_1 \ldots a_m)\}$
16:          $\Phi \leftarrow \hat{\Phi}$
17:      return $\Delta$    ▷ Return all anchor tree lists As discussed above with respect to FIG. 3, the record extraction module 122 may utilize a domain constraint (e.g., post-date), deemed a pivot, to locate the anchor trees. However, not all the nodes containing text having a format of the domain constraint are real pivots. For example, in forum posts, UGC may also contain strings in date format. Accordingly, the process 500 may identify all candidate pivots. The candidate pivots may include nodes containing text which is in the format of the domain constraint. For example, if the domain constraint is post-date, then all nodes having text in the format of a date may be considered candidate pivots. Approaches using pivots as domain constraints may be referred to as Pivot Matching (PM) methods.

Once the candidate pivots are identified, the record extraction module 122 may initialize a tag path set Φ with the candidate pivots at 502 (e.g., lines 4-5 of the pseudo-code of Table 2). The tag path set Φ may be a hash map with keys as a tuple (v,path) indicating that a node v may be reached by tag path grown from a candidate pivot. If v is a candidate pivot, the tag path may be v's HTML tag itself (e.g., line 5 of the pseudo-code of Table 2). The value of the hash map will be elaborated later. The algorithm may start a loop that traverses the tree and grows the tag paths upward level by level following the child-parent link (e.g., lines 6-16 of the pseudo-code of Table 2). For example, at 504, if Φ.keys contains two or more tag paths, the loop may proceed. The loop may be divided into three parts. For example, in the first part (e.g., lines 8-11 of the pseudo-code of Table 2), for every pair of (v, path) in Φ.keys (line 8), the parent, one level above, is added, as well as the extended tag path, to the hash set of the parent level $\hat{\Phi}$ (line 11), for example, at 506. The index of the child is also appended (v.childIndex) to a list, which is stored as the value in the hash map (line 11), to facilitate recovering the indices of the anchor trees later. In the second part (e.g., lines 12-15 of the pseudo-code of Table 2) the anchor tree lists in $\hat{\Phi}$ may be found. That is, for example at 508, if a parent p that can be reached via multiple child sub-trees by the same tag path (lines 3-14), then p will be the common parent of a data record list, and the mapped child index list $a_1 \ldots a_m$ will form the anchor tree list (line 15), for example, at 510, and will be added to the result set Δ (line 15), for example, at 512. Additionally, CD may be updated by $\hat{\Phi}$, which will be processed in the next iteration (line 16). This process may iterate until there is zero or only one tag path left in the set of Φ (e.g., line 6 of the pseudo-code of Table 2), for example at 504, where then, at 514, the loop may be exited and all anchor tree lists may be returned (e.g., line 17 of the pseudo-code of Table 2).

Figure 6:
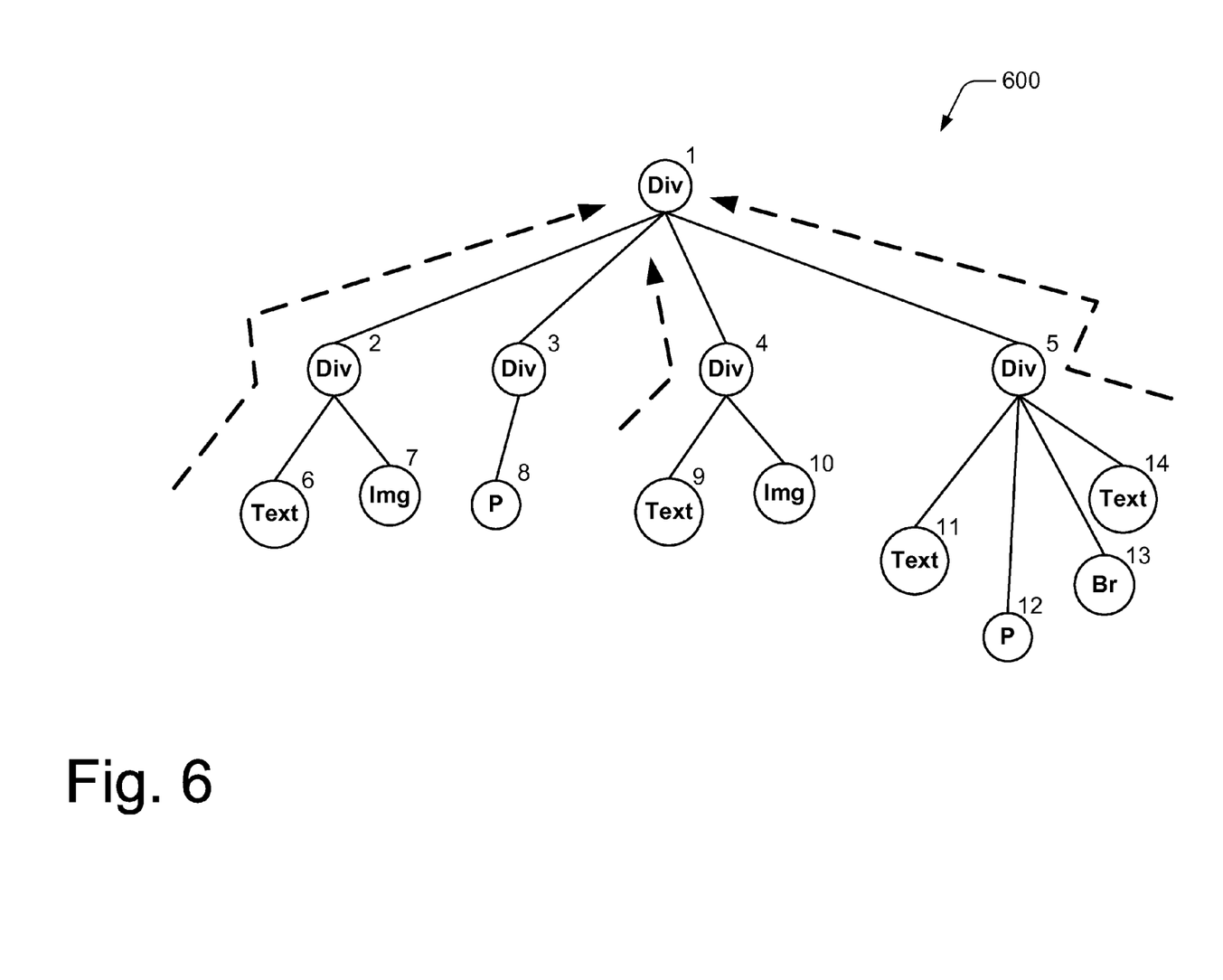
FIG. 6 is a pictorial diagram showing an illustrative Document Object Model (DOM) tree in accordance with various embodiments.

FIG. 6 shows an illustrative Document Object Model (DOM) tree 600 where a node identification number is shown in superscript at each node. Further, in this example, nodes 6, 9, and 14 represent candidate pivots. As an illustrative, non-limiting example, the illustrative algorithm shown in Table 2 is applied to the DOM tree shown in FIG. 7. Each key-value pair in the hash map Φ may be stated as key: value.

In the initialization process, the hash map Φ may be as follows:

$$\Phi = \Phi^{(0)} = \left\{ \begin{array}{l} (6, \text{'TEXT'}): () \\ (9, \text{'TEXT'}): () \\ (14, \text{'TEXT'}): () \end{array} \right\}$$

In the second iteration, the hash map Φ may be as follows:

$$\Phi = \Phi^{(0)}$$

$$\hat{\Phi} = \Phi^{(1)} = \left\{ \begin{array}{l} (2, \text{'DIV/TEXT'}): (6) \\ (4, \text{'DIV/TEXT'}): (9) \\ (5, \text{'DIV/TEXT'}): (14) \end{array} \right\}$$

In this iteration, an anchor tree is not found. For ease of presentation, only node identifications are shown in the value as opposed to the value as stated in the algorithm (e.g., line 11 of the pseudo-code of Table 2).

In the third iteration, the hash map Φ may be as follows:

$$\Phi = \Phi^{(1)}$$

$$\hat{\Phi} = \Phi^{(2)} = \{(1, \text{'DIV/DIV/TEXT'}): (2,4,5)\}$$

In this iteration, node 1 may be reached via three child sub-trees by the same tag path DIV/DIV/TEXT. Accordingly, a list of anchor trees may be found in this iteration comprising sub-trees 2, 4, and 5.

The subsequent iteration halts the loop since $|\Phi\text{.keys}| = |\Phi^{(2)}\text{.keys}| = 1$.

Siblings of the pivot may be taken into consideration to improve the accuracy of anchor tree finding using tag paths. For example, anchor trees may be filtered out if the siblings of pivots are dissimilar from the anchor tree list. In various embodiments, anchor trees are filtered out if the siblings of pivots are dissimilar from the majority of the anchor tree list. In various embodiments, the difference of sibling numbers may approximate sibling matching. For example, if the difference of numbers of sibling nodes is greater than a threshold, the sibling nodes are treated as dissimilar and the corresponding pivots may not be matched. Table 3 shows a pseudo-code identifying anchor trees taking siblings of pivots into account.

TABLE 3

Pseudo-Code for Illustrative Anchor Tree
Identification Considering Sibling Nodes

| | |
|---|---|
| 1: | procedure FINDANCHORTREES(T) |
| . | |
| . | |
| . | |
| 13: | $a_1 \ldots a_m \leftarrow$ FILTER(p,$\hat{\Phi}$[(p,path)]) |
| . | |
| . | |
| 18: | procedure FILTER(p,$a_1 \ldots a_m$) |
| 19: | $t_1 \ldots t_n \leftarrow$ the child sub-tree list of p |
| 20: | Θ ← { } |
| 21: | for i ← 1 to m do |
| 22: | $sn_i$ ← { } |
| 23: | for candidate pivot v under sub-tree $t_{a_i}$ do |
| 24: | b ← the number of siblings of v |
| 25: | $sn_i$[b] ← TRUE |
| 26: | for b in $sn_i$.keys do |
| 27: | Θ[b] ← Θ[b] + 1 |
| 28: | b* ←arg max$_b$ Θ[b] |
| 29: | remove $a_i$ from $a_1 \ldots a_m$ if ∀\|b − b*\| ≤ τ, b ∉ $sn_i$.keys |
| 30: | return the reduced list $a'_1 \ldots a'_{m'}$ |

In various embodiments, this algorithm may be incorporated in to the algorithm as shown in Table 2, for example, by replacing line 13 to call FILTER(p,$\hat{\Phi}$[(p,path)]) as well as in FIG. 5 at 516. FILTER may scan each anchor tree $t_{a_i}$ in the list and stores in $sn_i$ whether the anchor tree contains a pivot whose number of siblings is a particular value b (e.g., line 25 of the pseudo-code of Table 3). In various embodiments, the most frequent sibling b* may be counted, the anchor trees that do not have pivots whose sibling number is equal or close to b* by a threshold τ may be filtered out (e.g., line 29 of the pseudo-code of Table 3), and the reduced list returned (e.g., line 30 of the pseudo-code of Table 3). Approaches using pivots and siblings as domain constraints may be referred to as Pivot and Sibling (PS) matching methods.

As an illustrative, non-limiting example, the illustrative algorithm shown in Table 3 is applied to the DOM tree shown in FIG. 6. Suppose the rightmost candidate pivot (node 14) is not part of UGC and should not be matched with other pivots. The number of siblings of the first two candidate pivots (node 6 and 9) is 1, while for the last candidate pivot (node 14), this number is 3. By setting the threshold τ=1 the false candidate pivot (node 14) may be successfully removed as well as the corresponding candidate anchor tree (node 5).

As illustrated by FIG. 6, the data extraction engine 116 may extract the data records containing the UGC even though the data records containing the UGC are non-consecutive and even though the UGC is unstructured.

Figure 7:
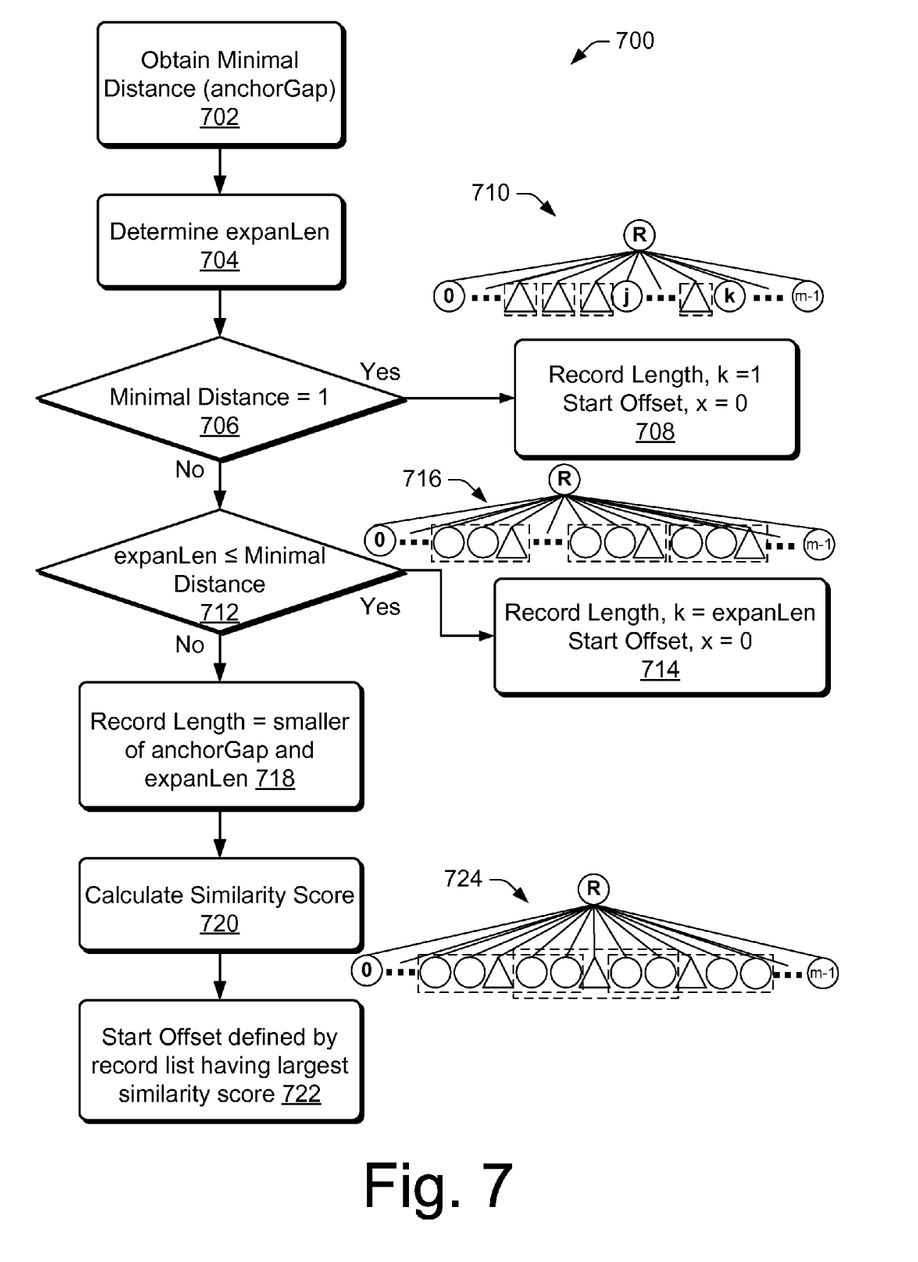
FIG. 7 is a flow diagram that shows an illustrative process of determining record boundaries in accordance with various embodiments.

FIG. 7 describes an illustrative process 700 to determine record boundaries. The illustrative process 700 may be performed by the record extraction module 122 and may further illustrate operations performed during the determine record boundary block 412 of the illustrative process 400 (e.g., line 5 of the pseudo-code of Table 1).

For reference, pseudo-code illustrating the process 700 of determining record boundaries is provided below in Table 3.

TABLE 4

Pseudo-Code for Illustrative Determining Record Boundaries

```
1:   procedure DETERMINEBOUNDARY (p,a₁ ... aₘ)
2:       t₁ ... tₙ ← the child sub-tree list of p
3:       anchorGap ← min_{1<i≤m}(aᵢ - aᵢ₋₁)
4:       left ← 0              ▷left boundary of expansion
5:       for j ← 1 to min{anchorGap,a₁} - 1 do
6:           if all t_{a₁-j}, ..., t_{aₘ-j} have same tag then
7:               left ← left - 1
8:           else
9:               break
10:      right ← 0             ▷right boundary of expansion
11:      for j ← 1 to min{anchorGap - 1, n - aₘ} do
12:          if all t_{a₁+j}, ..., t_{aₘ+j} have same tag then
13:              right ← right + 1
14:          else
15:              break
16:      expanLen ← right - left + 1    ▷length of expansion
17:      k ← min{anchorGap, expanLen}   ▷length of record
18:      R* = [ ]                        ▷initialize the result
19:      for x ← k - expanLen to 0 do   ▷enumerate start offset
20:          Rᵢ⁽ˣ⁾ ← t_{aᵢ+x} ... t_{aᵢ+x+k-1} for i = 1 ... m
21:          R⁽ˣ⁾ ← R₁⁽ˣ⁾ ... Rₘ⁽ˣ⁾    ▷records of the current offset
22:      R* = arg max{Score(R*),Score(R⁽ˣ⁾)}
23:      return R*            ▷return the record list
```

At 702, the record extraction module 122 obtains the minimal distance, anchorGap, between two anchor trees (e.g., line 3 of the pseudo-code of Table 4). In some instances, the record extraction module 122 calculates the distance between each pair of the anchor trees located in the illustrative process 500 and then sets anchorGap to be the minimum of these distances.

At 704, the record extraction module 122 determines the expansion length, expanLen (e.g., lines 4-16 of the pseudo-code of Table 4). In some instances, the record extraction module 122 starts from each anchor tree and expands the data record in both directions from the anchor tree until one of two conditions are met. First, the record extraction module 122 ceases expanding in a direction if the record extraction module 122 encounters either a left or right boundary of the child sub-tree list or another anchor tree (e.g., lines 5 and 11 of the pseudo-code of Table 4). Second, the record extraction module 122 ceases expanding in a direction if the newly expanded data record violates a similarity assumption (e.g., lines 6-9 and 12-15 of the pseudo-code of Table 4).

The similarity assumption may be formulated as follows. In various embodiments data records may be structurally similar with each other to some extent. Specifically, given any two records, the structure of the data records may satisfy two conditions. First, all pairs of corresponding sub-trees in the data records may have the same tag at root (e.g., the two sub-tree lists may have the same tag sequence at the top level). Second, one pair of corresponding sub-trees in the data records such as the anchor trees may be judged as similar with respect to the domain constraint guided similarity measure in use (e.g., either PM or PS).

At blocks 706-722, the record extraction module 122 determines the record length, k, and the start offset, x. In some instances, the record extraction module 122 may use logic to determine the record length. For instance, if the minimal distance obtained at block 702 is equal to 1 (e.g., the "yes" path at block 706), then the record length, k, is determined to be 1 and the start offset, x, is determined to be 0 at block 708. One example of the situation discussed at block 708 is illustrated in the first illustrative DOM tree 710 where the triangles denote anchor trees and the dashed boxes denote expansions. In other words, if the minimal distance obtained at block 702 is equal to 1 then two or more of the anchor trees are adjacent and thus every single anchor tree forms its own data record.

If the minimal distance obtained at block 702 is 2 or greater (e.g., the "no" path at block 706), then the process 700 continues to block 712. At 712, the record extraction module 122 determines whether the expanLen determined at 704 is less than or equal to the minimal distance calculated at 702. If the expanLen calculated at 704 is less than or equal to the minimal distance calculated at 702 (e.g., the "yes" path at block 712), then, at block 714, the record length, k, is determined to be the expanLen (e.g., determined at block 704) and the start offset, x, is determined to be 0. One example of the situation discussed at block 714 is illustrated in the second illustrative DOM tree 716 where the triangles denote anchor trees and the dashed boxes denote expansions. In other words, the length of each expansion is less than or equal to the minimal distance between two anchor trees. For instance, in the second illustrative DOM tree 716, the expansion is circle, circle, triangle (e.g., TR, TR, DIV in an illustrative HTML example). In such a case, no two expansion regions around different anchor trees overlap with each other and it is natural that the sub-trees within each expansion form a data record.

If the expanLen calculated at 704 is greater than the minimal distance calculated at 702 (e.g., the "no" path at block 712), then the process 700 continues to block 718. At 718, the record length, k, is the smaller one between the minimal distance obtained at block 702 (anchorGap) and the expanLen determined at block 704 (e.g., line 16 of the pseudo-code of Table 3). At 720, the record extraction module 122 calculates the similarity score, Score($R^{(x)}$), for each record list, $R^{(x)}$, using Score($R^{(x)}$)=$\Sigma_{1 \leq i \leq m} \Sigma_{0 \leq j < k} JS(t_{a_i+x+j}, t_{a_{i-1}+x+j})$, where $$JS(t_1, t_2) = \frac{|D_1 \cap D_2|}{|D_1 \cup D_2|} = \frac{\sum_{i=1}^{C} \min(w_{1i}, w_{2i})}{\sum_{i=1}^{C} \max(w_{1i}, w_{2i})}$$

as defined by the Jaccard similarity between tags denoted by $D_1$ and $D_2$ of two trees $t_1$ and $t_2$ with C unique tags that occur in sub-trees $t_1$ and $t_2$, with $w_{1i}$ and $w_{2i}$ number of times that the ith tag appears in $t_1$ and $t_2$.

At 720 for each start offset x, the record list is $R^{(x)}=R_1^{(x)} \ldots R_m^{(x)}$ (e.g., line 21 of the pseudo-code of Table 4), where $R_i^{(x)}=t_{a_i+x} \ldots t_{a_i+x+k-1}$ is the sub-tree list of the ith record (e.g., line 20 of the pseudo-code of Table 4).

After calculating the similarity score for each record list, the record extraction module 122 determines the start offset to be the offset leading to the record list that has the best similarity score at 722. One example of the situation discussed at blocks 718-722 is illustrated in the third illustrative DOM tree 724 where the triangles denote anchor trees and the dashed boxes denote expansions. In other words, if length of each expansion is greater than the minimal distance between two anchor trees, there may be two expansion regions overlapping on a few sub-trees. For instance, in the third illustrative DOM tree 724, where the expansion around each anchor tree contains exactly sub-trees of circle, circle, triangle, circle, circle, (e.g., TR, TR, DIV, TR, TR) and two consecutive expansion regions overlap on two sub-trees of circle, circle (e.g., TR, TR). In this case, the largest record length will be determined by the minimal distance of two anchor trees, (e.g., 3 in third illustrative DOM tree 724), and there will be ambiguity about the start offset of the data record. For example in third illustrative DOM tree 724 there are three possible start offsets, e.g., -2, -1 and 0 respectively. In this case, the record extraction module 122 finds the start offset leading to the maximum similarity among each of the possible choices.

Illustrative Time Complexity

Various embodiments of the data extraction algorithms may be analyzed with regard to the computational time complexity of its execution. For example, the algorithm discussed with reference to Table 2 may be analyzed as follows. For example, let n denote the number of tree nodes, h the height of the tree and c the number of candidate pivots. Assume that searching or inserting a key in the hash map is O(1). Initializing the hash map using the set of candidate pivots is O(c) (e.g., lines 4-5 of the pseudo-code of Table 2). The main loop (e.g., lines 7-16 of the pseudo-code of Table 2) may executed at most h times and each time costs O(|Φ.keys|+|Φ̂.keys|) since all operations are O(1). Further, |Φ.keys|≤|Φ̂.keys|≤c may be inferred for all iterations because each key (v,path) in Φ.keys generates at most one key (p,p.tag+'/'+path) in Φ̂.keys (e.g., line 11 of the pseudo-code of Table 2), and each candidate pivot v generates at most one key (v,v.tag) in the first Φ.keys (e.g., line 5 of the pseudo-code of Table 2). Therefore, each iteration of the main loop is O(c) and the total time complexity of the main loop is O(c·h). Accordingly, the cost is O(c·h) in total, which can be stated as O(n log(n)) since c≤n and h is expected to be log (n).

As a non-limiting example for illustrative purposes only, a case may be constructed where the algorithm takes no less than O(n log(n)) time. The input of this case is a complete binary tree where every left child has tag A and every right child has tag B and all leaf nodes are candidate pivots. For any internal node, tag paths from that node to leaf nodes are all different. So, |Φ.keys|=|Φ̂.keys|=c for all iterations of the main loop. Since c=(n+1)/2 and h=log(n+1), the algorithm takes no less than O(c·h)=O(n log(n)) time. This proves that O(n log (n)) is a tight time complexity for the algorithm.

Since each returned anchor tree list is associated with a tag path (e.g., line 13 of the pseudo-code of Table 2), sub-sets or the same set of an anchor tree list may be returned multiple times associated with different tag paths. However, for each returned anchor tree list ($a_1 \ldots a_m$) (e.g., line 15 of the pseudo-code of Table 2), it can be seen that index $a_i$ is generated by keys in Φ and each (v,path) in Φ.keys generates at most one index $a_i$=v.childIndex (e.g., line 11 of the pseudo-code of Table 2). So in each iteration the total size of returned anchor tree lists, e.g., $\Sigma_{(p,a_1 \ldots a_{mj}) \in \hat{\Phi}.keys} m_j$, is less than |Φ̂.keys|≤c. Since there are at most h iterations, the total size of all returned anchor tree lists is O(c·h)=O(n log(n)).

The time complexity of determining record boundary may be analyzed as follows. As stated by the input, let m be the number of anchor trees under a parent p. An embodiment of the record boundary algorithm may be performed in four steps:

1) Calculate the minimal gap of anchor trees (e.g., line 3 of the pseudo-code of Table 4). Time: O(m).

2) Determine the left and right boundary of the expansion (e.g., lines 4-16 of the pseudo-code of Table 4). Time: O(expanLen·m).

3) Calculate record length k (e.g., line 17 of the pseudo-code of Table 4). Time: O(1).

4) Determine the best start offset among all possible candidates and the corresponding best record list (e.g., lines 19-22 of the pseudo-code of Table 4). In each iteration of the loop, given an offset x, the record list $R^{(x)}$ in O(k·m) is constructed. Regarding computing Score($R^{(x)}$), let constant C be the number of distinct HTML tags on the DOM tree, then the tag bag $D_i$ of every sub-tree $t_i$ can be precomputed in O(Cn)=O(n) time (here n is the number of nodes in the DOM tree) and then JS($t_i$, $t_j$) can be computed in O(C)=O(1) time. So computing Score($R^{(x)}$) may be done in O(C·k·m)=O(k·m). Since the loop will be executed expanLen−k+1 times (Line 19), the time complexity of this loop will be O((expanLen−k+1)·k·m).

So the overall time complexity can be expressed as O(expanLen·m+(expanLen−k+1)·k·m) which can be further refined as follows:

Where expanLen≤anchorGap and thus k=expanLen, the time complexity will be O(k·m).

Where expanLen>anchorGap and thus k=anchorGap, it can be seen that −(anchorGap−1)≤left≤0 (line 5) and 0≤right≤anchorGap−1 (line 11); so expanLen=right−left+1≤2·anchorGap−1=2k−1. Therefore the time complexity will be O((2k−1)·m+k·k·m)=O($k^2$·m).

In practice, the record length k is usually a small number, say <10, thus k can be regarded as a constant. Therefore, in all three cases the time complexity of the boundary determination algorithm is O(m), e.g., linear to the size of the anchor tree list. Since the boundary determination algorithm is applied to each anchor tree list, the entire time complexity of determining record boundary is also O(n log(n)). Therefore using the algorithm, the total time complexity of determining record boundary is O(n log (n)), and so is that of MiBAT.

The addition of pivot sibling consideration remains O(n log(n)). For example, in each iteration the filtering scans each candidate pivot at most once in O(c) time, thus the additional cost is still O(c·h)=O(n log(n)) in total.

Other methods of determining and extracting data are discussed in patent application Ser. No. 12/945,517 filed on Nov. 30, 2010, which is hereby incorporated by reference. One of those methods discusses tree matching, hereinafter "Tree Matching". Generally, the Tree Matching method may be analyzed for time complexity.

For example, let n denote the number of nodes of a DOM tree T. In the Algorithm discussed in Table 2 of Tree Matching, procedure FINDANCHORTREES enumerates every two sibling child sub-trees $t_i$ and $t_j$ (lines 3 and 7). Note that each sibling node pair $(t_i, t_j)$ is enumerated at most once, thus the inner-most loop (lines 8-13) is executed $O(n^2)$ times. Inside the inner-most loop, most operations are O(1), except the call of procedure DOMAINCOMPARE (line 9), which will be analyzed in the following two paragraphs.

DOMAINCOMPARE first invokes the top down tree matching procedure TREEMATCHING for computing the matching between sub-trees $t_i$ and $t_j$ (line 1). It is known that the total time complexity of top down tree matching is $O(n^2)$. So line 1 in DOMAINCOMPARE is $O(n^2)$ in total.

After obtaining the tree matching result M, DOMAINCOMPARE enumerates every pair of underneath candidate pivots u and v, and checks against the domain similarity in use (lines 3 and 4). Each pair of candidate pivots u and v is enumerated and checked at most once (when $t_1 \ldots t_n$ is the child sub-tree list of the lowest common ancestor node of u and v in the procedure FINDANCHORTREES), so lines 4 and 5 are executed at most $O(n^2)$ times in total. DOMAINSIMILARITY can be computed in O(1) based on the tree matching result M, so DOMAINCOMPARE is $O(n^2)$ in total. Since all operations in FINDANCHORTREES, except DOMAINCOMPARE, cost $O(n^2)$, and the total cost of DOMAINCOMPARE is $O(n^2)$, the total time complexity of anchor tree finding is thus $O(n^2)$.

An experiment was conducted to compare the different algorithm approaches. A data gathering test was performed on a dataset comprising forum thread pages collected from 307 sites that cover 219 different forum software packages with the various methods described. The results are shown in Table 5. MiBAT+PM and MiBAT+PS are various embodiments discussed with respect to the Tree Matching Algorithm. MiBAT2+PM is the algorithm according to the embodiment described with respect to Table 2 while MiBAT2+PS is the algorithm according to the embodiment described with respect to Table 3. In Table 5, Prec. is the number of correctly extracted records divided by the number of extracted records; Rec. is the number of correctly extracted records divided by the number of true records in the dataset; Perfect is the percentage of pages for which the algorithm does not extract any wrong records nor miss any true records.

TABLE 5

Comparison Between MiBAT Algorithms

| | Accuracy | | | Time per page (ms) | |
|---|---|---|---|---|---|
| | Prec. | Rec. | Perfect | Avg. | Std. Dev. |
| MiBAT + PM | 97.1% | 95.1% | 89.8% | | |
| MiBAT + PS | 97.8% | 96.6% | 90.8% | 390.2 | 5577.6 |
| MiBAT2 + PM | 93.6% | 93.7% | 88.1% | | |
| MiBAT2 + PS | 95.9% | 95.3% | 88.6% | 11.2 | 13.4 |

From these results, one may determine that the algorithms described in this application provide an increase in efficiency with a comparatively small loss of accuracy.

Illustrative Computing Device and Illustrative Operational Environment

Figure 8:
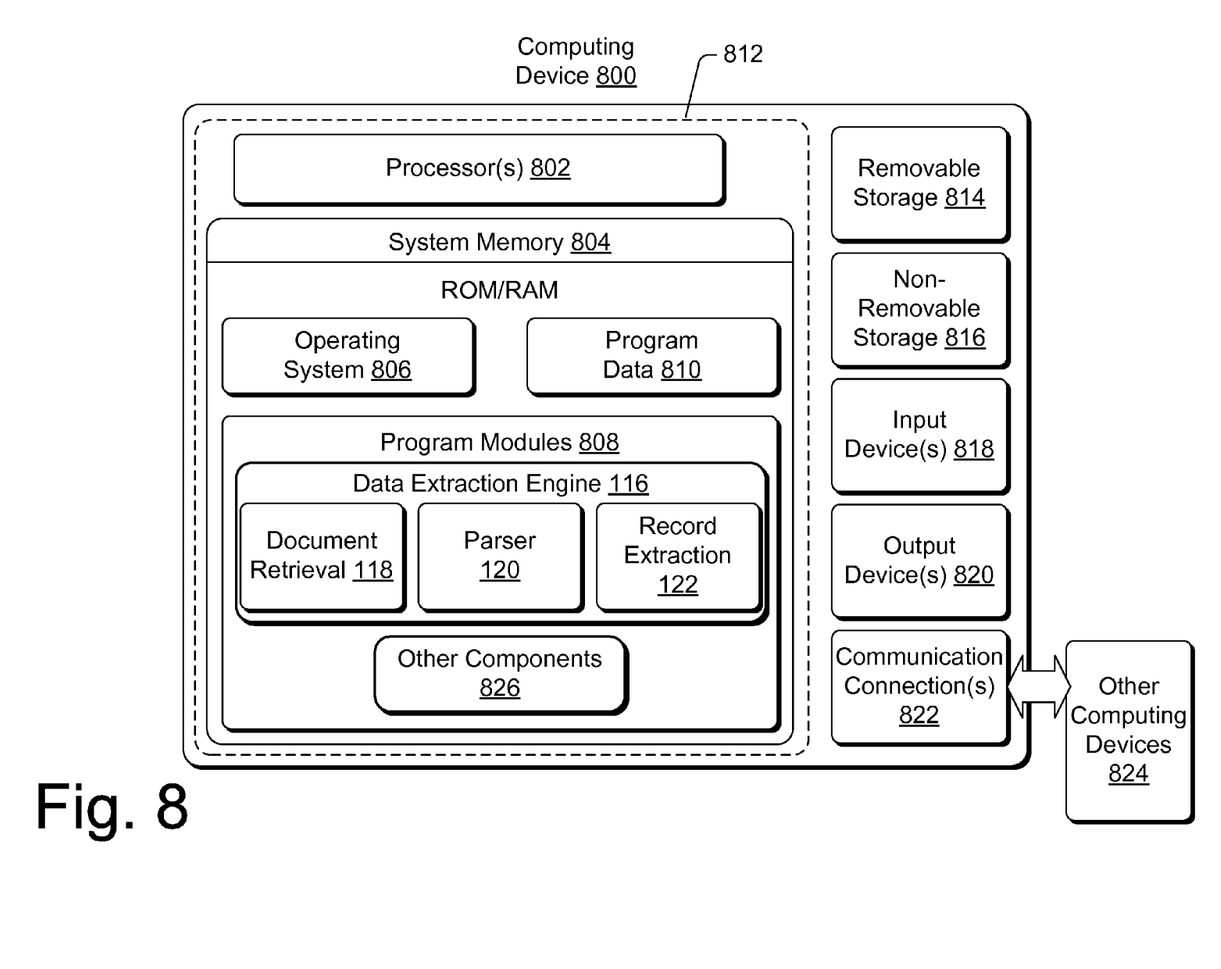
FIG. 8 is a block diagram that illustrates a representative system that may implement the data extraction engine.

FIG. 8 illustrates a representative computing device 800 that may, but need not necessarily be used to, implement the data extraction described herein, in accordance with various embodiments. The techniques and mechanisms described herein may be implemented by multiple instances of computing device 800 as well as by any other computing device, system, and/or environment. The computing device 800 shown in FIG. 8 is only one example of a computing device and is not intended to suggest any limitation as to the scope of use or functionality of any computing device utilized to perform the processes and/or procedures described above.

The computing device 800 may be operable to extract data records containing user-generated content (UGC) from documents. For instance, the computing device 800 may be operable to receive documents, parse documents into DOM trees, and extract data records from the documents.

As described above, the data extraction engine 116 may extract data records containing UGC using the processes illustrated in FIGS. 3-7. For instance, the data extraction engine 116 may enable the computing device 102 and/or computing device 800 to retrieve documents, process the documents into a DOM tree, extract data records from the document, and store the extracted data records to the program data 810.

In at least one configuration, the computing device 800 includes at least one processor 802 and system memory 804. The processor(s) 802 may execute one or more modules and/or processes to cause the computing device 800 to perform a variety of functions. In some embodiments, the processor(s) 802 may include a central processing unit (CPU), a graphics processing unit (GPU), both CPU and GPU, or other processing units or components known in the art. Additionally, each of the processor(s) 802 may possess its own local memory, which also may store program modules, program data, and/or one or more operating systems.

Depending on the exact configuration and type of the computing device 800, the system memory 804 may be volatile (such as RAM), non-volatile (such as ROM, flash memory, miniature hard drive, memory card, or the like) or some combination thereof. The system memory 804 may include an operating system 806, one or more program modules 808, and may include program data 810. The computing device 800 is of a very basic illustrative configuration demarcated by a dashed line 812. Again, a terminal may have fewer components but may interact with a computing device that may have such a basic configuration.

Program modules 808 may include, but are not limited to, data extraction engine 116, document retrieval 118, parser 120, record extraction 122, and/or other components 826.

The computing device 800 may have additional features and/or functionality. For example, the computing device 800 may also include additional data storage devices (removable and/or non-removable) such as, for example, magnetic disks, optical disks, or tape. Such additional storage is illustrated in FIG. 8 by removable storage 814 and non-removable storage 816.

The storage devices and any associated computer-readable media may provide storage of computer readable instructions, data structures, program modules, and other data. Computer-readable media includes, at least, two types of computer-readable media, namely computer storage media and communications media.

Computer storage media includes volatile and non-volatile, removable and non-removable media implemented in any method or technology for storage of information such as computer readable instructions, data structures, program modules, or other data.

Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

Moreover, the computer-readable media may include computer-executable instructions that, when executed by the processor(s) 802, perform various functions and/or operations described herein.

The computing device 800 may also have input device(s) 818 such as a keyboard, a mouse, a pen, a voice input device, a touch input device, etc. Output device(s) 820, such as a display, speakers, a printer, etc. may also be included.

The computing device 800 may also contain communication connections 822 that allow the device to communicate with other computing devices 824, such as over a network. By way of example, and not limitation, communication media and communication connections include wired media such as a wired network or direct-wired connections, and wireless media such as acoustic, radio frequency (RF), infrared, and other wireless media. The communication connections 822 are some examples of communication media. Communication media may typically be embodied by computer readable instructions, data structures, program modules, etc.

The illustrated computing device 800 is only one example of a suitable device and is not intended to suggest any limitation as to the scope of use or functionality of the various embodiments described. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The implementation and administration of a shared resource computing environment on a single computing device may enable multiple computer users to concurrently collaborate on the same computing task or share in the same computing experience without reliance on networking hardware such as, but not limited to, network interface cards, hubs, routers, servers, bridges, switches, and other components commonly associated with communications over the Internet, as well without reliance on the software applications and protocols for communication over the Internet.

CONCLUSION

The subject matter described above can be implemented in hardware, software, or in both hardware and software. Although implementations have been described in language specific to structural features and/or methodological acts, it is to be understood that the subject matter defined in the appended claims is not necessarily limited to the specific features or acts described above. Rather, the specific features and acts are disclosed as example forms of implementing the claims. For example, the methodological acts need not be performed in the order or combinations described herein, and may be performed in any combination of one or more acts.

What is claimed is:

1. A system comprising:
one or more processors;
memory;
a parser module stored in the memory and executable by the one or more processors to process a document into a document tree that includes at least two nodes corresponding to user-generated content; and
a record extraction module stored in the memory and executable by the one or more processors to:
apply a domain-constraint-guided similarity measure to locate, using at least one domain constraint and an upward path matching procedure, two or more anchor trees in the document tree, the two or more anchor trees being a first set of sibling sub-trees, wherein each sibling sub-tree in the first set of sibling sub-trees includes a similar tag path, the domain-constraint-guided similarity measure based in part on a tag path hash map of a format structure of the document;
determine a record boundary of a second set of sibling sub-trees in the document tree around each of the two or more anchor trees; and
extract at least one data record around each of the two or more anchor trees based at least in part on the record boundary.

2. The system of claim 1, wherein the record extraction module locates the two or more anchor trees based in part on candidate pivots comprising nodes associated with the at least one domain constraint.

3. The system of claim 1, wherein at least one of the two or more anchor trees comprise a mapped child index where a parent node may be reached via multiple sub-trees by the similar tag path.

4. The system of claim 1, wherein the record extraction module locates the two or more anchor trees based in part on a tag path set comprising nodes and associated tag paths, wherein the nodes may be reached by the associated tag paths.

5. The system of claim 4, wherein the associated tag paths are grown from candidate pivots upward through the document tree following a child-parent link.

6. The system of claim 1, wherein the similar tag path includes the at least one domain constraint associated with a structured portion of the at least one data record, the at least one domain constraint based on the format structure of the document.

7. The system of claim 1, wherein at least one of the two or more anchor trees comprises segments of the at least one data record within the document tree that have a document tree structure that matches a document tree structure of all other data records in the document that contains the user-generated content when analyzed using the upward path matching procedure, based on the domain-constraint-guided similarity measure, the domain-constraint-guided similarity measure being either a pivot match or a pivot and sibling match.

8. The system of claim 1, wherein the upward path matching procedure comprises matching tag paths through a hash map.

9. The system of claim 1, wherein the document tree comprises a Document Object Model tree.

10. A method comprising:
  processing, by one or more processors, a document into a document tree that includes at least two nodes corresponding to user-generated content;
  applying a domain-constraint-guided similarity measure to locate, by the one or more processors and based on at least one domain constraint and an upward tag path matching procedure, two or more anchor trees in the document tree as being a first set of sibling sub-trees, wherein each sibling sub-tree in the first set of sibling sub-trees includes a similar tag path, the domain-constraint-guided similarity measure based in part on a tag path hash map of a format structure of the document;
  determining, by the one or more processors, a record boundary as being a second set of sibling sub-trees in the document tree that surround each of the two or more anchor trees; and
  extracting, by the one or more processors, at least one data record around each of the two or more anchor trees based on the record boundary.

11. The method of claim 10, wherein the locating the two or more anchor trees is based in part on a tag path set comprising nodes and associated tag paths, wherein the nodes may be reached by the associated tag paths.

12. The method of claim 11, wherein the locating the two or more anchor trees further comprises growing the associated tag paths from candidate pivots upward through the document tree following a child-parent link.

13. The method of claim 10, wherein the similar tag path includes the at least one domain constraint associated with a structured portion of the at least one data record, the at least one domain constraint based on the format structure of the document.

14. The method of claim 10, wherein the locating further comprises matching an upward tag path of the at least one domain constraint.

15. The method of claim 10, wherein at least one of the two or more anchor trees comprises segments of the at least one data record within the document tree that have a document tree structure that matches a document tree structure of all other data records in the document that contains the user-generated content when analyzed using the upward tag path matching procedure, based on the domain-constraint-guided similarity measure, the domain-constraint-guided similarity measure being either a pivot match or a pivot and sibling match.

16. The method of claim 10, wherein the upward tag path matching procedure comprises matching tag paths through a hash map.

17. The method of claim 10, wherein the document tree comprises a Document Object Model tree.

18. One or more computer storage devices storing computer-executable instructions that, when executed, cause one or more processors to perform acts comprising:
  processing a document into a document tree that includes at least two nodes corresponding to user-generated content;
  applying a domain-constraint-guided similarity measure to locate two or more anchor trees in the document containing the user-generated content, the document being analyzed using an upward path matching procedure, the two or more anchor trees being a first set of sibling sub-trees, each sibling sub-tree in the first set of sibling sub-trees includes a domain constraint associated with a structured portion of a data record, the domain-constraint-guided similarity measure based in part on a tag path hash map of format structures of the document;
  determining a record boundary as being a second set of sibling sub-trees in the document tree that surround each of the two or more anchor trees; and extracting at least one data record containing the user-generated content around each of the two or more anchor trees based on the record boundary.

19. The one or more computer storage devices of claim 18, wherein at least one of the two or more anchor trees comprises segments of the at least one data record within the document tree that have a document tree structure that matches a document tree structure of all other data records in the document that contains the user-generated content when analyzed using the upward path matching procedure, based on the domain-constraint-guided similarity measure, the domain-constraint-guided similarity measure being either a pivot match or a pivot and sibling match.

20. The one or more computer storage devices of claim 18, wherein the upward path matching procedure comprises matching tag paths through the tag path hash map.

* * * * *